United States Patent [19]

Powers

[11] 4,423,987
[45] Jan. 3, 1984

[54] GARBAGE CONVEYING SYSTEM

[76] Inventor: Lewis R. Powers, P.O. Box 11165, Zephyr Cove, Nev. 89448

[21] Appl. No.: 215,604

[22] Filed: Dec. 12, 1980

[51] Int. Cl.³ .............................................. B65G 53/48
[52] U.S. Cl. ..................................... 406/56; 141/104; 241/DIG. 38; 406/120; 406/173
[58] Field of Search ........................ 406/12, 19, 29, 31, 406/62, 117, 120, 168, 169, 170, 171, 172, 173, 183, 56, 61; 241/18, 24, 60, 79.1, 134, DIG. 38; 141/104

[56] References Cited

U.S. PATENT DOCUMENTS

| | | | |
|---|---|---|---|
| 3,157,439 | 11/1964 | Salmona | 406/120 X |
| 3,236,565 | 2/1966 | Kester et al. | 406/173 |
| 3,480,330 | 11/1969 | Hirs et al. | 406/172 |
| 3,814,331 | 6/1974 | Ronning . | |
| 3,854,910 | 12/1974 | Hammerquist . | |
| 3,856,217 | 12/1974 | Brewer . | |
| 3,981,454 | 9/1976 | Williams . | |
| 3,987,968 | 10/1976 | Moore et al. . | |
| 4,034,918 | 7/1977 | Culbertson et al. . | |
| 4,037,795 | 7/1977 | Fyfe . | |
| 4,059,246 | 11/1977 | Anders et al. | 406/31 |
| 4,113,185 | 9/1978 | Marsh et al. . | |
| 4,171,710 | 10/1979 | Boynton et al. | 141/104 X |
| 4,185,973 | 1/1980 | Tester | 241/DIG. 38 |

FOREIGN PATENT DOCUMENTS 2527836 1/1977 Fed. Rep. of Germany ...... 406/170
53-123569 10/1978 Japan .

OTHER PUBLICATIONS

"Air Density Separator" brochure by Rader Corporation.

Primary Examiner—Jeffrey V. Nase
Attorney, Agent, or Firm—Klarquist, Sparkman, Campbell, Leigh & Whinston

[57] ABSTRACT

A garbage conveying system is provided. The system has upstream and downstream ends and includes a plurality of remote terminals adapted to receive garbage at a plurality of locations, a central terminal for receiving garbage from each of the remote terminals, and a plurality of remote terminal valves positioned between each of the remote terminals and the central terminal for selective isolation of one or more of the remote terminals. The central terminal includes (1) a suction blower positioned adjacent the downstream end of the system, (2) a separator positioned upstream of the blower, with the separator having a lower portion for the discharge of at least a portion of the garbage passing into the separator, and an upper portion for the passage of air and any remaining garbage therethrough, (3) a filter positioned between the separator and the blower filtering out the remaining garbage, with the filter including a lower portion for the discharge of the garbage therefrom, and (4) a garbage valve for permitting the flow of garbage from the lower portions of the separator and filter while minimizing the flow of air therethrough. The invention may also be defined as a method for conveying garbage, including the steps of receiving garbage at a plurality of remote terminals, comminuting the garbage at such terminals, selectively conveying the garbage from one of the terminals through the use of blower suction, separating out at least a portion of the garbage, filtering out the remainder of the garbage, and collecting the separated out and filtered out garbage.

11 Claims, 4 Drawing Figures

GARBAGE CONVEYING SYSTEM

BACKGROUND AND SUMMARY OF THE INVENTION

This invention relates to garbage disposal. More particularly, the invention relates to vacuum-type garbage conveying systems which include a plurality of remote reception terminals, and a central collection terminal wherein suction blower means are positioned at the downstream end of the system to maintain a partial vacuum in the system for conveying garbage, while providing means to prevent the leakage of contaminated air from the remote reception terminals.

One such system is disclosed in U.S. Pat. No. 4,037,795 to Fyfe. Fyfe recognized that it is important to prevent air, which may have been contaminated within the waste disposal system, from escaping through the remote reception terminals or any other opening in the system. He also appreciated that even if a leak does occur in the system, means should be provided to prevent the contaminated air from being allowed to escape therethrough. Fyfe minimized leakage by maintaining a constant negative pressure on the system. In the event of failure of his primary blower, he included a backup blower to ensure that negative pressure would be maintained at the remote reception terminals at all times.

There are several serious drawbacks with Fyfe's system. First, even when none of the remote reception terminals is being utilized, at least one of the blowers must, nonetheless, be running to prevent air from backing up through the remote terminals. Thus, this design is not only expensive, it is inefficient. Fyfe's system would also be characterized by a relatively high noise level at the remote terminals because air is constantly being withdrawn from the region of such terminals, into the system.

The prior art also discloses the desirability of feeding comminuted garbage into systems designed to segregate garbage into its various components. However, such garbage segregation systems have not dealt with the problems which surround the design of a central garbage disposal system having a plurality of remote terminals adapted to receive garbage. For example, the release of contaminated air and excessive noise at the central terminal is not typically a problem, because such systems normally operate outside in the open air or in an isolated location. Also, such systems are typically operated by plant engineers and persons of similar skills, rather than the unskilled custodians who actually collect the garbage.

Therefore, the present invention has one or more of the following objects, taken individually or in combination:

(1) To provide a system for conveying garbage from a plurality of dispersed, remote terminals to a single central terminal, wherein the remote terminals are sufficiently quiet and odor-free to permit such terminals to be located in inhabited areas;

(2) To develop a garbage conveying system which requires no presegregation or presorting into the various components thereof;

(3) To provide a waste conveying system which operates on a minimum amount of power, while ensuring controlled flow of wastes through the system, even if such wastes include substantial amounts of liquid;

(4) The provision of a totally enclosed system wherein any one of the remote terminals may be isolated from the central system to prevent the release of contaminated vapors when the central suction blower is shut down;

(5) The development of a system in which raw garbage may be fed into a plurality of remote terminals where the garbage is comminuted before passing through conduits to a central terminal for deposit into a central garbage receptacle where such garbage may either be compacted or utilized as fuel; and (6) The provision of a garbage conveying system which permits unskilled custodians who collect the garbage at remote locations to control the operation of the system with minimal training.

This invention responds to the problems presented in the prior art by providing a garbage conveying system having upstream and downstream ends, a plurality of remote terminals at the upstream end for cumulatively receiving garbage at a plurality of locations, and a central terminal for receiving garbage from each of the remote terminals. Each of the remote terminals preferably includes means, such as a grinder, for comminuting the garbage. The central terminal includes suction blower means defining the downstream end of the system. Remote terminal valve means are positioned between each of the remote terminals and the central terminal for selective isolation of the remote terminals from the central terminal. These remote terminal valve means normally comprise a plurality of remote terminal valves, one of each being positioned immediately downstream of one of the remote terminals. The central terminal also includes separator means positioned upstream of the suction blower means. The separator means has a lower portion for discharging at least a portion of the garbage passing into the separator means, and an upper portion for the passage of air and any remaining garbage therethrough. Filter means are positioned between the separator means and the suction blower means for filtering out the remaining garbage from the air and for directing the now-filtered air toward the suction blower means. The filter means also include a lower portion for discharging garbage therefrom. Garbage valve means are included in the system for permitting garbage to flow from the lower portions of the separator and filter means while minimizing the flow of air therethrough. These garbage valve means normally comprise first and second motor driven rotary valves, one of ecah being mounted to the lower portion of the separator means and the filter means, respectively.

The invention may alternatively be defined as a method for conveying garbage comprising the steps of receiving garbage at a plurality of dispersed, remote terminals, comminuting the garbage at those terminals, and selectively conveying the garbage therefrom through the use of suction blower means. The garbage is actually conveyed from only one of the remote terminals at any particular time, with the remainder of the remote terminals being isolated from the suction blower means by remote terminal valves. Also included are the additional steps of separating out at least a portion of the garbage and then filtering out the remainder. The garbage separated out and filtered out is passed through either one common or two separate garbage valve means for minimizing the flow of air into the system, and is then collected in garbage receptacle means.

These and other objects, features, and advantages of the present invention will be apparent from the following description, appended claims, and annexed drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
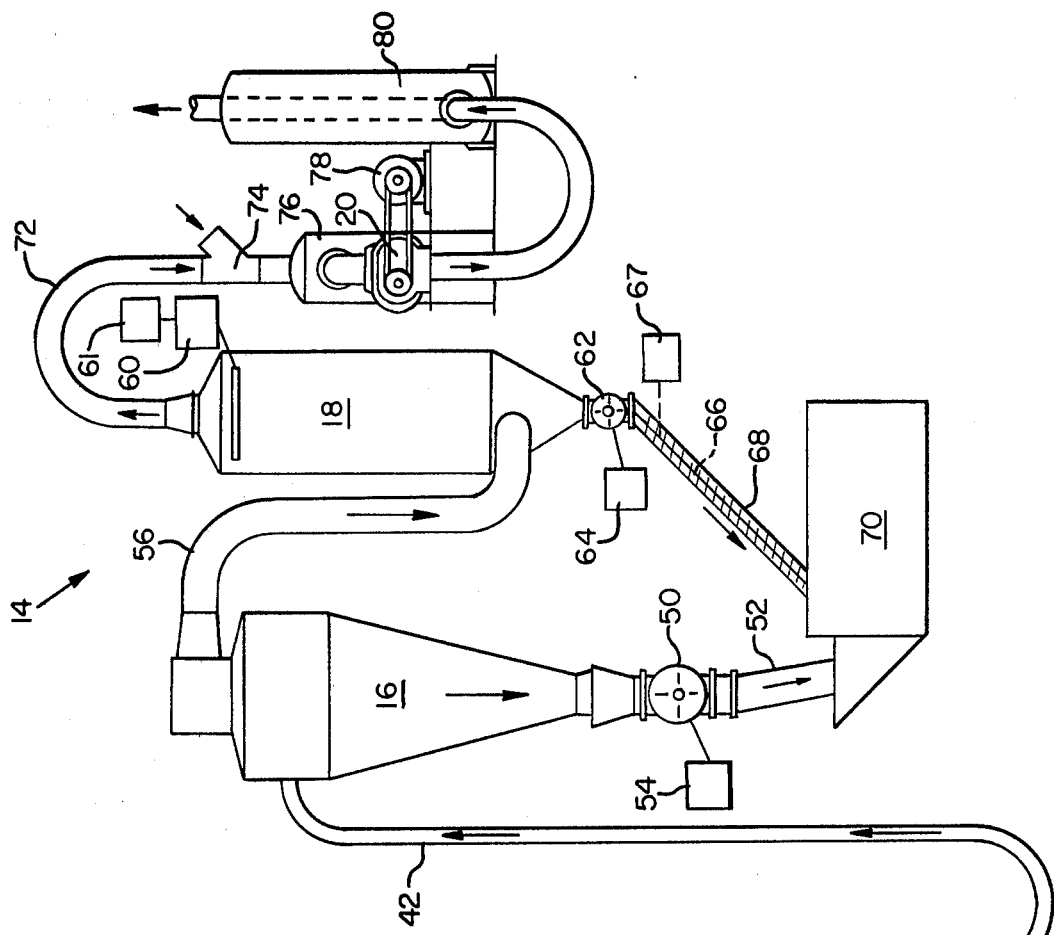
FIG. 1 is a schematic depiction of one embodiment of the present invention depicting four remote terminals and the central terminal.
Figure 1:
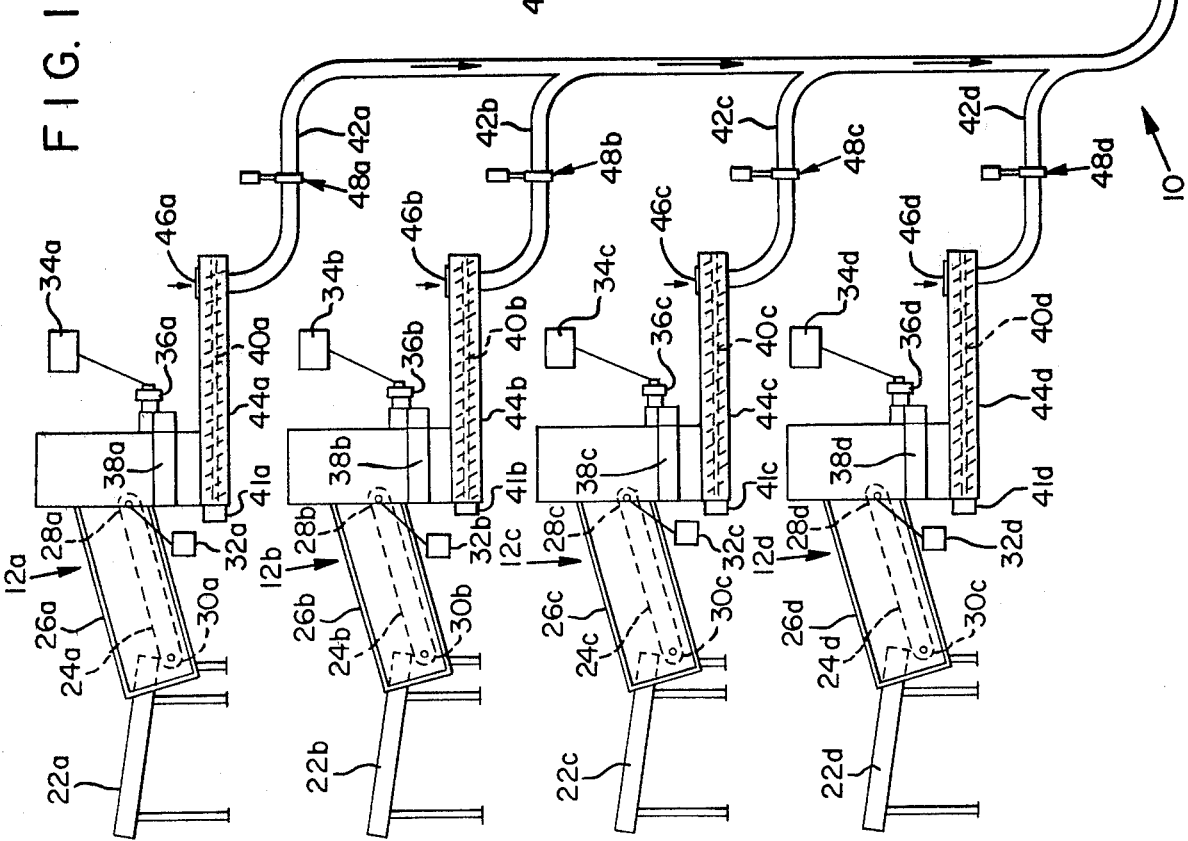

The principles of this invention are particularly useful when embodied in a garbage conveying system such as that illustrated in FIG. 1, generally indicated by the numeral 10. The depicted garbage conveyor system 10 includes a plurality of remote terminals which are cumulatively adapted to receive garbage at a plurality of widely dispersed locations. This renders the garbage conveyor system 10 particularly well suited for large facilities, such as major hotels, industrial plants, or complexes of office buildings. The four remote terminals depicted in FIG. 1 have been identified with the numerals 12a, 12b, 12c, and 12d, since they are normally of identical construction. However, it should be appreciated that various modifications may be made to any particular remote terminal in order to specifically adapt that terminal to the type of garbage being received. For example, a terminal positioned in the food preparation area of a hotel might be adapted to receive a higher proportion of liquids than would a terminal positioned in an office building. Nonetheless, in order to simplify this discussion, it will be assumed that the remote terminals 12a through 12d are substantially identical in construction. It should also be appreciated that any number of additional remote terminals may also be provided.

Each of the remote terminals 12a through 12d is connected via appropriate conduits (to be described below) to a central terminal 14. This central terminal 14 includes a cyclone separator 16, a bag-type filter 18, and a motor driven blower 20. The blower 20 and its associated equipment defines the downstream end of the garbage conveyor system 10. The upstream end is defined by remote terminals 12a through 12d. The construction of garbage conveying system 10 will be described beginning with the upstream end of the system.

As noted above, it will be assumed that remote terminals 12a through 12d are of identical construction. For this reason, corresponding elements from such remote terminals have been identified with corresponding numerals suffixed by the letter corresponding to that remote terminal. To simplify this discussion, reference will only be made to remote terminal 12a, although it should be appreciated that corresponding elements are included in the other remote terminals 12b through 12d.

Remote terminal 12a includes a tray 22a which is adapted to receive garbage. The tray 22a is typically concealed behind a door (not shown) or other means for concealing the presence of remote terminal 12a. The tray 22a directs the garbage to a continuous conveyor 24a. This conveyor 24a is of conventional design and may be of the belt or chain link type, depending upon the type of garbage being received at remote terminal 12a. A conveyor casing 26a encloses conveyor 24a. This casing should be of sufficient size to permit passage of relatively bulky garbage therethrough.

Conveyor 24a is driven between a drive roller 28a and an idler roller 30a by a conventional electric conveyor motor 32a which is usually variable speed, but may alternatively be fixed speed. Hydraulic fluid is provided under pressure to a hydraulically operated grinder motor 36a by a hydraulic pump 34a. This grinder motor 36a powers a grinder 38a. This grinder 38a, alternatively referred to herein as comminuting means, is also of conventional design. This type of grinder is sometimes referred to as a shear type shredder, although that designation has not been used herein. One such grinder, sold by Saturn Mfg. Co. and designated as Model No. 2422H, is disclosed in U.S. Pat. No. 4,034,918 to Culbertson. As described in the Culbertson patent, grinder motor 36a preferably is of the self-reversing type which permits the grinder 38a to be reversed in the event that jamming occurs or if pieces of garbage of excessive size are taken therein. Grinder motor 36a automatically shifts between forward and reverse modes at timed intervals to clear grinder 38a of the obstruction. Thus, all of the garbage received at remote terminal 12a will be effectively reduced in size or comminuted to facilitate passage through the garbage conveyor system 10.

The comminuted garbage is directed downwardly from grinder 38a into a screw type auger 40a, which is powered by an electric auger motor 41a. Auger 40a conveys the comminuted garbage away from the grinder and toward a remote terminal conduit 42a. Since this system 10 is specifically adapted to convey liquids as well as solids, the clearance between auger 40a and its casing 44a should be sufficiently small to ensure that liquids will be delivered without leakage, such as by gravity, in an upstream direction. If auger casing 44a is substantially horizontal or is inclined downwardly from grinder 38a, then the fit between auger 40a and its casing 44a is not so critical.

A vent 46a is positioned adjacent the downstream end of auger casing 44a to permit ambient air to flow into the system at this point. This vent 46a is not absolutely necessary if there is sufficient leakage of air through grinder 38a (which is open to the atmosphere). Some venting means are necessary in order to provide air to the system since the air acts as a vehicle to entrain and transport comminuted garbage through the system.

The remote terminal conduit 42a directs comminuted garbage from remote terminal 12a to the cyclone separator 16 in the central terminal 14. As depicted, the various terminal conduits 42a through 42d normally merge into a common remote terminal conduit 42 upstream of cyclone separator 16. However, upstream of this merger of remote terminal conduits 42a through 42d, and normally in the vicinity of each of the remote terminals 12a through 12d, remote terminal valves 48a through 48d are positioned in remote terminal conduits 42a through 42d to permit isolation of the remote terminals from the rest of the system 10, and thereby control the flow of air and comminuted garbage through the remote terminal conduits. The remote terminal valves 48a through 48d are typically air operated, solenoid controlled gate valves. The solenoid control permits the remote terminal valves to be remotely controlled, for reasons which will become evident as this description continues.

As mentioned above, the four remote terminal conduits 42a through 42d merge into a common remote terminal conduit 42 downstream of the remote terminal valves 48a through 48d. The common remote terminal conduit 42 extends to the central terminal 14. As noted above, one major advantage of the present invention is that central terminal 14 may be disposed in an area with limited public access, and in which odors, noise, and other undesirable effects of such systems may be kept from the inhabited areas in the vicinity of the remote terminals 12a through 12d. For example, central terminal 14 may be disposed in an underground boiler room, or may actually be placed in its own building which could be removed from inhabited facilities.

Cyclone separator 16 is disposed at the upstream side of central terminal 14. Comminuted garbage is drawn into the upper region of cyclone separator 16 by the partial vacuum being drawn by blower 20. Cyclone separator 16 is of conventional design, such as that manufactured by Archer Blower Co., designated Model No. $72 \times 36 \times 2.0$ Cone. It is adapted to separate the denser components of the comminuted garbage, and permit such components to drop downwardly from cyclone separator 16. A first rotary valve 50 is provided immediately below cyclone separator 16 in order to permit the dense comminuted garbage components to flow from cyclone separator 16 into a separator discharge conduit 52, while minimizing the flow of air in an upward direction into the cyclone separator 16. Without first rotary valve 50, ambient air would have a tendency to flow upwardly into cyclone separator 16 as a result of the partial vacuum being drawn by blower 20. First rotary valve 50 is continuously driven by a 7.4 horsepower electric motor 54 at a speed sufficient to ensure that little if any of the dense garbage components passing downwardly out of cyclone separator 16 will be accumulated in the lower region of the cyclone separator. This motor 54 may be of the variable speed type, but that capability is normally not necessary.

The lighter components which enter cyclone separator 16 are drawn upwardly out of the separator into a filter intake conduit 56. This conduit leads to bag type filter 18, which receives this remaining garbage adjacent its lower end and directs it through a plurality of bag type filter elements (not shown). Filter 18 is also of conventional design and for this reason has not been depicted, nor will be described, in detail. It is of the Mikro-Pulsair type manufactured by U.S. Filter Co., and typically includes seven filter bags, six of which are on line at any one time, with one being in a cleaning cycle. A compressor 60 is mounted to the upper portion of filter 18 to provide pressurized air for cycled cleaning of the filter bags. By pulsing compressed air through such bags, the garbage and other debris which has been filtered out of the airstream is blown downwardly out of the filter 18. Appropriate switches, to be described below, are provided in order to control the cycling of cleaning operations. Compressor 60 is normally powered by a 5 horsepower electric motor 61.

Positioned immediately below the filter 18 is a second rotary valve 62 which is driven by a $\frac{1}{2}$ horsepower electric motor 64 or larger if necessary. Like first rotary valve 50, second rotary valve 62 is designed to facilitate the regular flow of garbage out of filter 18 while minimizing the leakage of air into the filter. Motor 64 rotates this valve at a speed sufficient to ensure that little or no garbage collects in the lower portion of filter 18. Like first rotary valve 50, second rotary valve 62 may be provided with a variable speed capability, but such is not normally necessary.

The depicted garbage conveyor system 10 includes a filter extractor screw 66 with its motor 67 for conveying garbage from the vicinity of second rotary valve 62. This filter extractor screw 66 is often not necessary for system 10 to operate properly. However, it does speed the flow of garbage from second rotary valve 62, thereby minimizing the possibility of congestion which might occur due to the fact that the garbage being discharged from filter 18 is so light that gravity alone may not be adequate to ensure proper flow.

A single garbage receptacle 70 is shown in the depicted embodiment. This garbage receptacle 70 receives garbage from both cyclone separator 16 and filter 18. It may be desirable in certain applications to include two such receptacles (not shown) in the event that the garbage components may be treated differently or used for different purposes. In any event it is anticipated that the garbage conveyor system 10 will permit the garbage components to be used as a primary or secondary fuel either at the facility in which the system is being used, or elsewhere. Alternatively, a compactor (not shown) may be positioned adjacent garbage receptacle 70 to compact the garbage before depositing it into the garbage receptacle.

The air which has been drawn through filter 18 passes out a blower intake conduit 72. An electrically controlled bypass valve 74 is positioned in blower inlet conduit 72 upstream of blower 20. This bypass valve 74, when open, permits blower 20 to draw intake air from the ambient atmosphere rather than from filter 18 via blower intake conduit 72. This bypass valve 74 is desirable so that the portion of garbage conveying system 10 which is upstream of blower 20 will not always remain in partial vacuum condition whenever blower 20 is operating. For example, when none of the remote terminals 12a through 12d is being used, there is no need to put the entire system under a partial vacuum. Naturally, this would not only increase the electric power being utilized by blower 20, but could, over an extended period, result in leaks in the system.

A blower intake silencer 76 is positioned at the immediate upstream side of blower 20 in order to minimize blower noise passing through the system conduits. This silencer 76 is typically manufactured by Stoddard, Model No. L-61G-12.

While filter 18 will normally remove all of the garbage entrained in the air being drawn by blower 20, it may be desirable to position a conventional intake filter adjacent the upstream side of blower 20. However, since such a filter is normally not needed, it has not been depicted.

Blower 20 is of the positive displacement type, and is motor driven, typically by blower motor 78 having 100 horsepower. Particularly well suited for this system is a Sutorbilt blower, Model No. 1030-3100, or equivalent.

As noted above, central terminal 14 is normally positioned in an isolated area. Nonetheless, it is still desirable that noise emanating from central terminal 14 be kept to a minimum. For this reason, a discharge silencer 80 is normally mounted on the discharge side of blower 20. Discharge silencer 80 is of conventional design, also manufactured by Stoddard, bearing Model No. D-33T-12.

Figure 2:
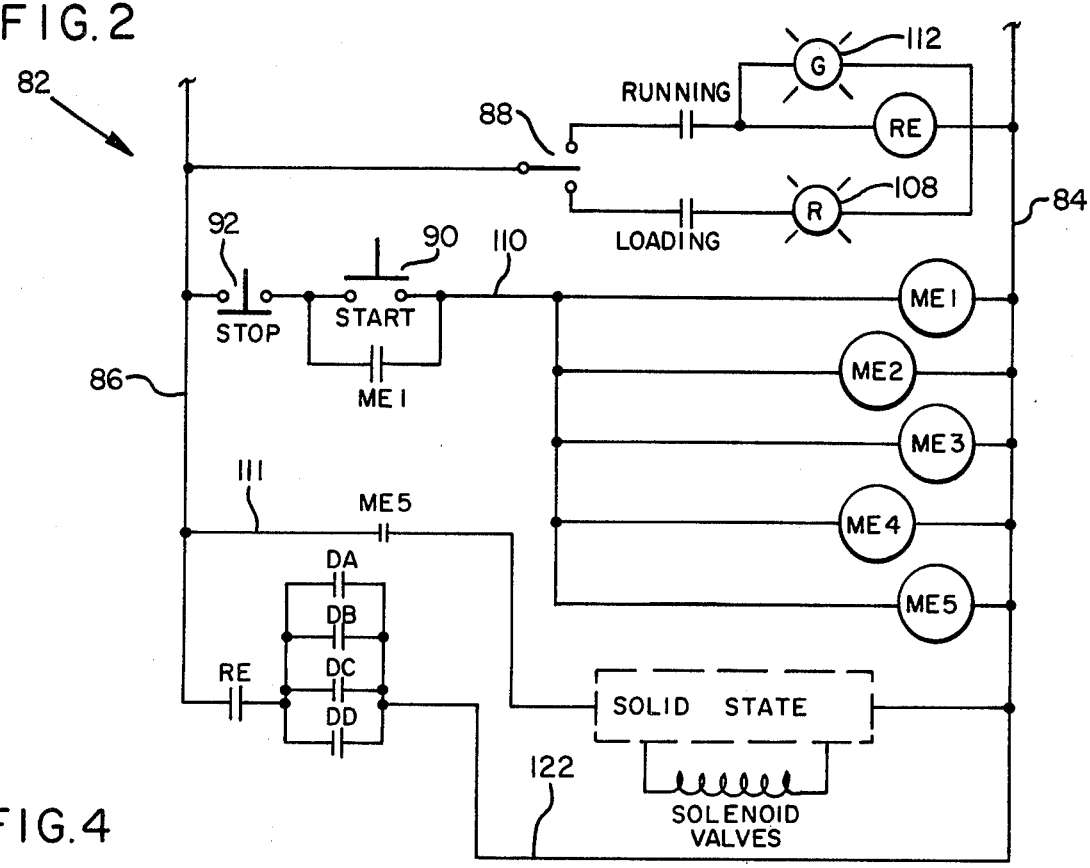
FIG. 2 is a simplified electrical circuit diagram showing the main control circuit of the embodiment of FIG. 1.
Figure 4:
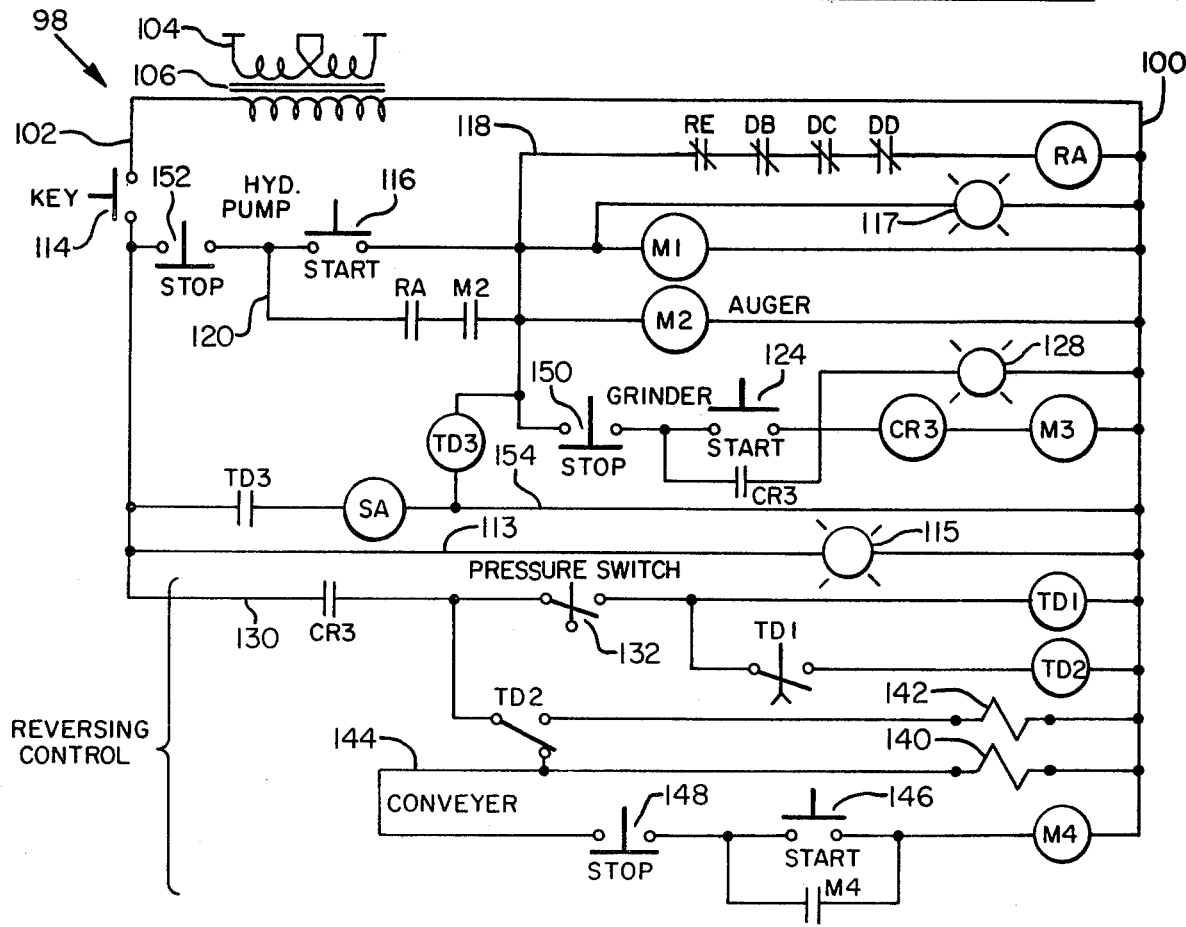
FIG. 4 is a simplified electrical circuit diagram showing a control circuit used at each of the remote terminals depicted in FIG. 1.
Figure 3:
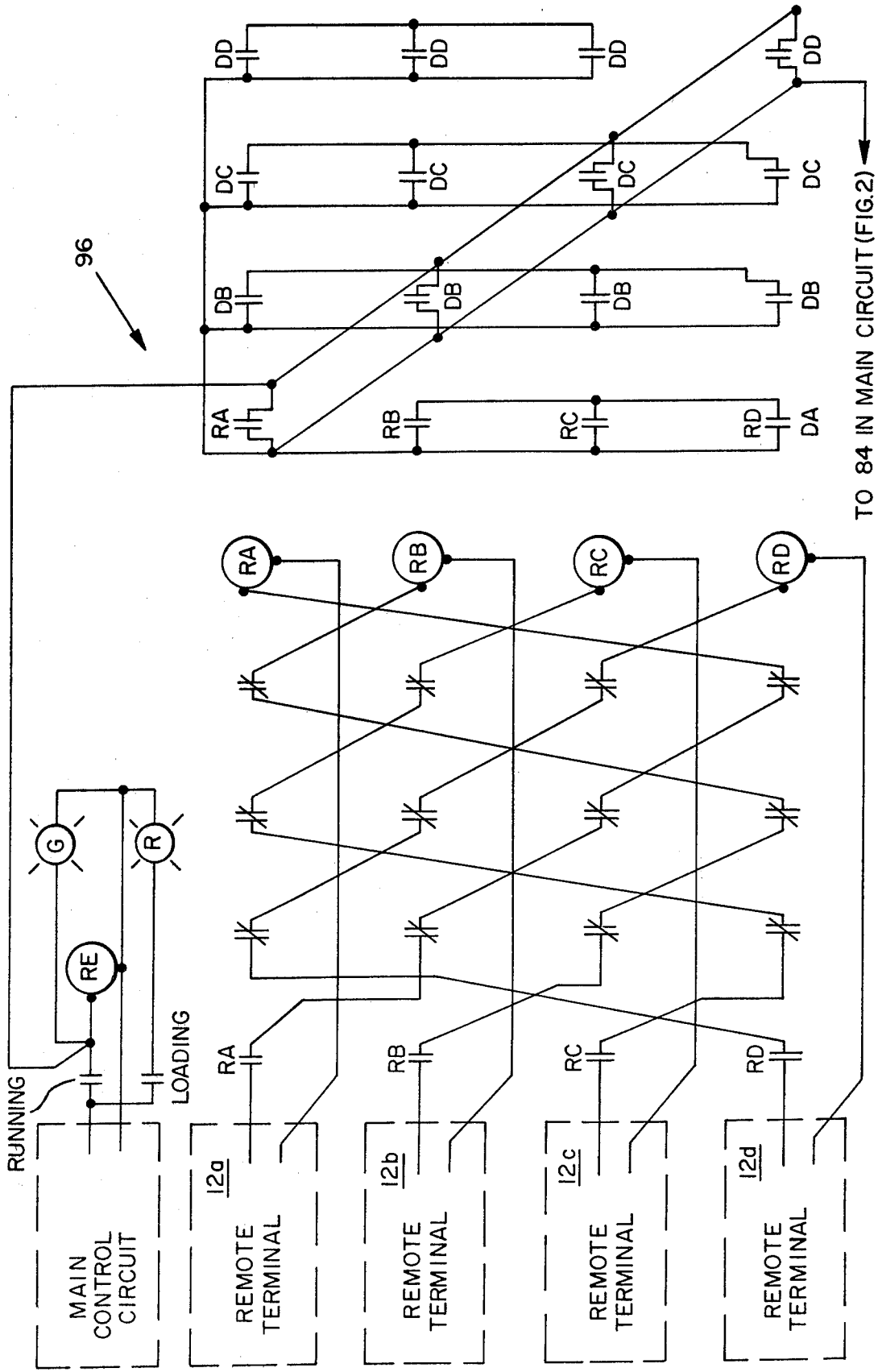
FIG. 3 is a simplified electrical circuit diagram showing the lock out circuitry used in the embodiment of FIG. 1.

FIGS. 2, 3, and 4 schematically depict the electrical circuitry used with the present invention. The circuitry has been simplified since the large majority of it is conventional in design. Reference should be made to the Culbertson patent mentioned above for more complete description of typical control circuitry for the grinder used in these types of garbage disposal systems.

FIG. 2 schematically depicts the main control circuitry for the garbage conveying system 10. The depicted main control circuit, generally identified with the numeral 82, includes primary electrical conductors 84 and 86, a two position switch 88, start and stop switches 90 and 92, as well as other components which will be discussed below in the Operation section of this discussion.

FIG. 3 is a schematic depiction of the electrical interlock circuit which ensures that only one of the plurality of remote terminals 12a through 12d will be activated at any particular time. This circuit, identified generally with the numeral 96, includes a plurality of relays which will also be described in the Operation section of this description.

FIG. 4 is a schematic diagram of a remote terminal circuit 98. One of these circuits is provided for each of the remote terminals 12a through 12d. The depicted remote terminal circuit is associated with remote terminal 12a; so for this reason the letter A will be used in identifying some of the relays depicted therein. This remote terminal circuit 98 shows only a portion of circuit 104 for the hydraulic pump 34a, and a transformer 106 which steps up voltage from the electrical control portion of the circuit to motor circuit 104. The electrical control portion of remote terminal circuit 98 includes primary electrical conductors 100 and 102.

The remote terminal circuit 98 also includes a number of subcircuits which permit the control and operation of the various components of the remote terminal 12a. These subcircuits will be described in the Operation section of this description.

FIG. 4 has deleted many of the conventional features typically found in such systems. For example, various sensors are typically included to sense the level, the pressure, and the temperature of the hydraulic oil in the various hydraulic motors. Therefore, it should be appreciated that various subcircuits may be added to the depicted circuitry in order to provide this sensing capability to remote terminal circuit 98. Reference should be made to the Culbertson patent for a description of typical sensing circuits.

OPERATION

When the garbage conveyor system 10 is in an inactive mode, all of the motors in the system are shut down, and remote terminal valves 48a through 48d are in closed positions, thereby isolating remote terminals 12a through 12d from central terminal 14. In order to activate the system, the two position switch 88 in main control circuit 82 (depicted in FIG. 2) is switched to the "Loading" mode. This energizes red lamp 108 positioned at each of the remote terminals 12a through 12d to indicate that the system is not yet ready to receive garbage. The system start switch 90 is then closed, thus permitting electricity to flow through subcircuit 110, energizing motor relays ME1, ME2, ME3, ME4, and ME5, thereby closing relay contacts to start blower motor 78, first rotary valve motor 54, second rotary valve motor 64, filter extractor screw motor 67, and compressor motor 61, respectively. The energizing of motor relay ME1 closes relay contact ME1 to keep subcircuit 110 energized until stop switch 92 is opened. Energizing of motor relay ME5 closes relay contact ME5 in subcircuit 111 to energize the seven solenoid valves which control the cyclical cleaning of the filter bags in filter 18.

Thus, it is evident that during this Loading mode, the system is being prepared for operation. Specifically, cyclone separator 16 and filter 18 are being emptied of any residue contained therein, and the filter bags in filter 18 are being selectively cleaned. A vacuum is not yet being drawn on the system because bypass valve 74 is in an open or bypass condition, permitting blower 20 to draw air from the atmosphere rather than from blower intake conduit 72 and the rest of the system. All of remote terminal valves 48a through 48d are closed in the Loading mode.

If garbage conveyor system 10 is provided with a compactor (not shown) adjacent garbage receptacle 70, this compactor would also be activated during the Loading mode in order to prepare garbage receptacle 70 for the receipt of garbage from separator discharge conduit 52 and filter discharge conduit 68.

When two position switch 88 is moved to the "Running" mode, relay RE is energized, closing relay contact RE in subcircuit 122, thus preparing the various remote terminals 12a through 12d for operation. At the same time, green lamp 112 is activated at each of the remote terminals. This green lamp 112 indicates to custodians working in the vicinity of the remote terminals 12a through 12d that the garbage conveyor system 10 is ready to receive garbage. As mentioned above, for the purposes of this discussion it will be assumed that remote terminal 12a is being utilized.

The first step in using remote terminal 12a is to activate on-off switch 114 with a key, thus preventing operation of the system by unauthorized personnel. This will activate main power lamp 115 in subcircuit 113. Hydraulic pump start switch 116 may then be closed. This energizes motor relay M1 to start hydraulic pump 34a and activate its power lamp 117. The closing of start switch 116 energizes relay RA via closed relay contacts RE, DB, DC, and DD located in subcircuit 118, and, via appropriate contacts (not shown), causes bypass valve 74 to close. At the same time, motor relay M2 is energized, closing relay contact M2 to start auger motor 41a. The closing of relay contacts M2 and RA keeps the hydraulic motor circuit closed until hydraulic pump stop switch 152 is opened.

As noted previously, the shifting of two position switch 88 into a Running mode energizes relay RE. If two position switch 118 is in a Loading mode, open relay contact RE in subcircuit 118 will prevent the energizing of relay RA. The presence of relay contacts DB, DC, and DD in subcircuit 118 also serves to prevent the energizing of relay RA in the event that any of the other remote terminals 12b, 12c, 12d are in use. Referring to FIG. 3, it can be seen that energizing of RA will result in the respective circuits for remote terminals 12b, 12c, and 12d being locked out, thereby preventing an inadvertent attempt to utilize one of the other remote terminals 12*b*, 12*c*, or 12*d* while terminal 12*a* is in use.

Finally, energizing relay RE will also, through appropriate relays (not shown), energize solenoid SA to open remote terminal valve 48*a*.

After the hydraulic pump 34*a* has been started, grinder start switch 124 may be closed, energizing control relay CR3 and motor relay M3, thus closing relay contact CR3 in subcircuit 126, activating power lamp 128, and starting grinder motor 36*a*. As noted above, since this grinder motor 36*a* is typically a hydraulic motor operable from hydraulic pump 34*a*, energizing grinder motor 36*a* merely means that a solenoid (not shown) which controls flow of hydraulic fluid to grinder motor 36*a* is opened.

Once grinder 38*a* is running, conveyor start switch 146 may be closed, thereby energizing motor relay M4, closing relay contact M4 to start conveyor motor 32*a* and keep subcircuit 144 closed until conveyor stop switch 148 is opened. The conveyor motor circuit also includes subcircuit 130 which includes relay contact CR3. This contact prevents conveyor motor 32*a* from being energized until grinder 38*a* is operating.

As mentioned above, power lamp 128 will indicate to the custodian at remote terminal 12*a* that the terminal is ready to receive garbage. An indicator lamp is not necessary for the conveyor because it is normally visible to the operator. However, such a lamp may be included in subcircuit 144 if desired.

At this point, garbage may be deposited on tray 22*a*. The garbage will slide downwardly to conveyor 24*a* where it is conveyed into grinder 38*a*. After being ground or comminuted in grinder 38*a*, the garbage drops into auger casing 44*a* where it is conveyed to remote terminal conduit 42*a* by auger 40*a*.

This remote terminal conduit is under a partial vacuum due to the operation of blower 20, with air being let into the system only at vent 46*a*. The flow of air into vent 46*a* in combination with the action of auger 40*a* results in the garbage being conveyed into remote terminal conduit 42*a* past open remote terminal valve 48*a* to common remote terminal conduit 42, and into the upper portion of cyclone separator 16. Here, the heavier components of the garbage drop downwardly and pass out the bottom of the cyclone separator 16. The flow of this dense garbage out of cyclone separator 16 is ensured by first rotary valve 50 which rotates at a regular rate, thereby permitting a free flow of garbage while minimizing the passage of air into the cyclone separator. The garbage is thus directed through separator discharge conduit 52 and into garbage receptacle 70.

The lighter components of the garbage are drawn upwardly from cyclone separator 16 into separator discharge conduit 52 where they pass into the lower portion of filter 18. Here, the airborne garbage is directed to six of the seven filter bags (not shown) located in filter 18. As noted above, the seventh filter bag is being cleaned by the action of compressed air from compressor 60. Compressor 60 runs continuously so that it will always be cleaning one of the bags in filter 18 as long as the system 10 is operating. A timed indexing mechanism is built into filter 18 in order to shift the various bags from an active to a cleaning mode.

Thus, the remaining garbage entrained with the air passing through garbage conveying system 10 is removed by filter 18. This garbage drops downwardly to the lower portion of filter 18 where it is removed by second rotary valve 62. Like first rotary valve 50, second rotary valve 62 is rotated at a regular rate to permit the free flow of garbage therethrough, while minimizing the leakage of air. The filter extractor screw 66 receives the garbage from second rotary valve 62 and conveys it through filter discharge conduit to garbage receptacle 70.

The air which passes through filter 18 is directed by blower intake conduit 72 through the closed bypass valve 74 which, due to its closed position, prevents passage of local ambient air therethrough. The air then passes into blower intake silencer 76 and blower 20, before exhausting to the atmosphere via discharge silencer 80.

In order for the system to operate most efficiently, air at a velocity of approximately 5500 to 6500 feet per minute should be passing through blower 20. This will normally result in approximately 100–130 inches of water negative pressure at the blower inlet for larger systems, and 30 to 40 inches of water negative pressure for smaller size systems.

As mentioned above, each of the grinders 38*a* through 38*d* at the remote terminals is provided with a reversing mode which will prevent jamming in the event that excessively large or rigid pieces of garbage are deposited at the remote station. This reversing capability is made possible by a conventional mechanism described in detail in the Culbertson patent. For this reason, it will only be briefly described herein.

When jamming is likely to occur, the hydraulic pressure at hydraulic pump 34*a* rises above a predetermined level. This pressure closes a pressure operated switch 132 in subcircuit 130 of remote terminal circuit 98 (FIG. 4). This energizes time delay relay TD1, closing time delay relay contact TD1. This, in turn, energizes time delay relay TD2, closing time delay relay contact TD2, thus deactivating forward solenoid 140 and activating reversing solenoid 142. This reverses the flow of hydraulic fluid from hydraulic pump 34*a* which, in turn, reverses the rotation of grinder 38*a*. This results in the garbage therein being disgorged upwardly, thereby eliminating the danger of jamming.

After a time period determined by the time delay setting of TD1, relay contact TD1 is reopened, de-energizing time delay relay TD2 and reopening its relay contact TD2. This reactivates forward solenoid 140. If pressure switch 132 is still closed upon the reopening of time delay relay contact TD1, such contact will immediately be reclosed and will time out before reopening. This will continue until the pressure in the hydraulic circuit is reduced to a sufficient level to enable pressure operated switch 132 to reopen, indicating that the hydraulic circuit is operating within its normal pressure ranges and that the grinder 38*a* is cleared.

The presence of the second time delay relay TD2 ensures that the conveyor cannot be manually restarted until the obstruction in grinder 38*a* is cleared. Once the obstruction is cleared and time delay relay contact TD2 is reclosed, conveyor motor 32*a* may be manually restarted at conveyor start switch 146. This energizes motor relay M4, and its motor relay contact in order to permit conveyor 24*a* to be operated until manually stopped by stop switch 148 or by the closing of time delay relay contact TD2 as described above.

When work at remote terminal 12*a* is completed, grinder 38*a* is stopped by opening stop switch 150. The presence of control relay contact CR3 in subcircuit 130 de-energizes motor relay M4 and its relay contact, thus shutting down conveyor motor 32*a*. Hydraulic pump 34a is shut down by opening stop switch 152, thus de-energizing motor relay M1. This also de-energizes motor relay M2 which, through relay contacts, shuts down auger motor 41a.

A third time delay TD3 is built into subcircuit 154 to permit remote terminal valve 48a to remain open for a predetermined period of time (normally several minutes) to permit blower 20 to clear common remote terminal conduit 42. Thus, once grinder stop switch 150 is opened, time delay relay TD3 activates relay contact TD3 in subcircuit 154 to continue the flow of electricity to relay SA which maintains remote terminal valve 48a in its open position until the predetermined period passes. At that time, remote terminal valve 48a is closed. Once this valve closes, bypass valve 74 is opened. At this time any of the other remote terminals may be operated by following the procedure set forth above.

Of course, it should be understood that various changes and modifications of the preferred embodiments described herein will be apparent to those skilled in the art. For example, various limit switches may and normally will be included in the electrical system in order to provide safety cutouts in the various components of the garbage conveyor system 10. Such protection would typically be built into each of the remote terminals in the vicinity of the grinder. Other modifications can also be made without departing from the spirit and scope of the present invention and without diminishing its attended advantages. It is, therefore, intended that such changes and modifications be covered by the following claims.

I claim:

1. A garbage conveying system having upstream and downstream ends comprising:
    a plurality of remote terminals for receiving garbage, said remote terminals each including air intake means;
    remote terminal valve means disposed in the vicinity of said remote terminals, downstream of said air intake means of each said remote terminal, for selectively opening one remote terminal and its air intake means at a time to receive garbage and to permit air to flow therethrough and into the system;
    separator means disposed downstream of said remote terminals for separating the garbage from the air flow, said separator means having garbage valve means at a lower end thereof for continuously removing garbage while minimizing the flow of air therethrough, and air discharge means at an upper end thereof;
    suction blower means disposed in the vicinity of the downstream end of the system for creating a suction draft through a selected one of said remote terminals and for drawing air through said separator means; and
    screw-type auger means immediately upstream of each said air intake means for conveying garbage towards said separator means;
    said air intake means of each said remote terminal comprising the sole air intakes upstream of said separator means;
    each said valve means completely sealing off its associated remote terminal when such terminal is not in use to isolate said terminal from any noxious odors in the system.

2. The garbage conveying system of claim 1 further comprising remote terminal conduits extending between each of said remote terminals and said separator means.

3. The garbage conveying system of claim 2 wherein said remote terminal valve means comprise a plurality of remote terminal valves positioned in said remote terminal conduits immediately downstream of said remote terminals.

4. The garbage conveying system of claim 1 wherein each of said remote terminals includes comminuting means.

5. The garbage conveying system of claim 1 wherein said remote terminal valve means include remote control means.

6. The system of claim 1, wherein said separator means comprises a cyclone separator for removing most of the garbage from the air stream passing therethrough and filter means for filtering out the rest of the garbage.

7. The garbage conveying system of claim 6 wherein said garbage valve means comprise first and second rotary valves positioned below said cyclone separator and said filter means, respectively.

8. The garbage conveying system of claim 7 further comprising back flush means for providing fluid pressure to back flush and thereby clean said filter means.

9. The garbage conveyor of claim 7 further comprising a garbage receptacle for receiving garbage from said cyclone separator and filter means.

10. The garbage conveying system of claim 1 further comprising muffler means mounted to said suction blower means to reduce the intake discharge noise from said blower means.

11. The system of claim 1 including comminuting means immediately upstream of each said screw-type auger means for comminuting garbage received by said remote terminals.

* * * * *